«3,773,924
INTERFERON PRODUCTION
Monto Ho, 396 Midway Road 15216; John Allan Armstrong, 6607A Ridgeville St. 15217; and Yang-Hsien Ke and Yin-Hwee Tan, both of 2369 Tilbury Ave. 15217, all of Pittsburgh, Pa.
No Drawing. Filed Dec. 24, 1970, Ser. No. 101,390
Int. Cl. A61k 27/00
U.S. Cl. 424—85                           6 Claims

ABSTRACT OF THE DISCLOSURE

The yield of interferon is increased when cells are stimulated to produce interferon by sequential addition of metabolic inhibitors such as cycloheximide and actinomycin D.

---

The invention described herein was made in the course of work under a grant or award from the Department of Health, Education, and Welfare.

This invention relates to improvements in the art of interferon production. In particular, the invention relates to a process for increasing the yield of human interferon obtained from cell cultures.

It has been known that cells may be stimulated by viruses, certain microbial products, polynucleotides, or other synthetic materials to product interferon. Various investigators, including Vilcek and Chany, have postulated that the interferon production is checked by a negative feedback mechanism or, as we postulate, a control protein. However, these ideas have not been applied to the problem of interferon production.

Youngner and Hallum have shown that in mice cycloheximide increases the yield of interferon in response to the complexed double-stranded polyribonucleotide, polyinosinic:polycytidylic acid (poly I-poly C). Vilcek has shown that interferon production induced by poly I-poly C in rabbit cell cultures (although not in mouse cell cultures) can be increased in the presence of cycloheximide or actinomycin D.

We have now discovered a method of combining the effects of these antimetabolic substances to block sequentially protein and RNA synthesis in such a way that human interferon production is maximized. This rational combination of antimetabolic substances has been applied to human cells and should greatly contribute to the realization of economically practical production of interferon for use as an antiviral agent.

Our process consists of the following steps:
(1) Exposing human cells capable of producing interferon to an interferon inducer;
(2) Subsequent to or concomitant with the exposure to the interferon inducer, adding a reversible inhibitor of protein synthesis at a time prior to that when interferon production begins;
(3) When the maximum amount of interferon messenger RNA has been transcribed, adding an inhibitor of messenger RNA synthesis;
(4) After the passage of time sufficient to inhibit the messenger RNA, removing the protein inhibitor from the cells to permit protein synthesis and interferon production; and
(5) Incubating the cells to permit the maximum amount of interferon production.

Various types of human cells are known to be capable of producing interferon. Among these cells are euploid and aneuploid cells including human embryonic fibroblasts, leukocytes, including lymphocytes and lymphoblasts, amnion, skin and foreskin, kidney, and lung. In the practice of our process, these cells are exposed in known manner to any substance capable of stimulating the production of interferon. Many such substances are known, including viruses such as Newcastle disease virus and parainfluenza 1-Sendai; natural occurring multistranded nucleic acids; and synthetic polynucleotides such as poly I-poly C.

The first step is to expose cells to the inducer which triggers the synthesis of a messenger RNA (m-RNA). This generally requires a number of hours, e.g. about 2 to 24 hours. Were the incubation allowed to continue for this period of time without addition of inhibitors, interferon would be produced, via a postulated protein intermediate, but a control mechanism would ultimately stop interferon production. It is postulated that the initially produced interferon or an intermediate product is responsible for the appearance of a blocker messenger RNA, and that this m-RNA translates a control protein which in some way terminates production of interferon.

The second step of our process, however, consists of the reversible blocking of protein synthesis at some time prior to the time interferon production begins. The purpose of this step is to prevent the formation of a protein, possibly interferon, which is responsible for initiating the synthesis of the control protein. Among the reversible inhibitors of protein synthesis that may be used are cycloheximide, streptovitacin A, and other reversible protein inhibitors which do not affect the primary structure of proteins. The amount of protein inhibitor should be sufficient to inhibit effectively protein synthesis in the cell type employed. This is determined by methods known to the art including measurement of inhibition of incorporation of radio-active amino acids into proteins. The time of addition of the protein synthesis inhibitor must be prior to appearance of interferon as determined by examination of the kinetics of interferon production in the system used.

When the maximum amount of interferon messenger RNA has been transcribed, but prior to appearance of interferon, an inhibitor, preferably an irreversible inhibitor, of messenger RNA synthesis is added in the presence of the protein inhibitor to ensure that, when protein synthesis is eventually permitted, the blocker messenger RNA will not be transcribed. The point of maximum transcription is recognized by observing the effect of adding actinomycin D in the presence of cycloheximide at various times after addition of the inducer, on ultimate yield of interferon.

This requires a determination of (1) the duration of interferon m-RNA synthesis, and (2) the time of initiation of regulatory protein m-RNA synthesis. This is done in an experiment involving sets of cultures, to which actinomycin D is added at various times after the inducer and protein inhibitor have been added. The set which produces the maximal amount of interferon is used as a guide for production, as disclosed in Table 2 and by Tan et al., Proc. Nat. Acad. Sci., 67, 464–471 (1970). The preferred inhibitor is actinomycin D, but other inhibitors of messenger RNA synthesis such as other actinomycins and 8-azaguanine may be used. The concentration may be determined by methods known to the art such as inhibition of incorporation of radioactive uridine in RNA.

The protein inhibitor is then removed from the cells, generally by decanting and washing with an appropriate medium, buffer solution, or salt solution.

The cells are finally incubated according to known methods to permit the maximum amount of interferon to be produced.

The various media and other details of interferon induction are well known to the art. It is the use of the particular types of metabolic inhibitors in a controlled sequential manner that permits the maximization of interferon production and constitutes the present invention.

EXAMPLES

The following description illustrates the determination of the optimal conditions for carrying out the process of this invention; it is not to be construed as limiting the scope of the invention.

Human embryonic fibroblasts (HEF), obtained by trypsinization of an approximately 4 week embryo, are cultured in 5 cm. plastic dishes incubated under 5% $CO_2$. An appropriate medium such as Hank's balanced salt solution (HBSS) supplemented with 0.5% lactalbumin hydrolysate, 2 mM.L-glutamine, Eagle's vitamin mixture, antibiotics, and 5% inactivated (56° C. for 30 minutes) newborn calf serum is employed. HEF cultures are treated with 1.0 ml. (100 µg/ml.) of poly I:poly C or 0.2 ml. of Newcastle disease virus (NDV, about $10^9$ pfu. before inactivation) in the presence or absence of 100 µg/ml. of cycloheximide for one hour at 37° C. The egg-grown NDV (CG strain) is partially purified by differential centrifugation, suspended in 0.85% NaCl and inactivated by ultraviolet light as described by Tan et al., Proc. Natl. Acad. Sci. 67, 464–471 (1970), prior to use. The cultures are washed 3 times with 5 ml. HBSS to remove the inducer (poly I:poly C, or NDV) and incubated with or without metabolic inhibitor(s). The metabolic inhibitors when employed are removed from the cultures and the cultures washed 3 times (5 ml. HBSS per wash) prior to being replenished with medium not containing metabolic inhibitors. Concentrations, as well as times and duration of treatment of cells with metabolic inhibitors, may vary among cell types and inducers and are determined for the system employed.

The effect of cycloheximide on protein synthesis of HEF cells is measured by exposing cultures to $^{14}$C-leucine (Schwarz Bioresearch, average specific activity 222.6 mc./mmole) for 30 minutes at 5 µc./ml./plate. The effect of actinomycin D on HEF cultures is measured in the same fashion employing $^{14}$C-uridine (1 µc./ml./plate for 30 minutes). The incorporation of precursors into trichloroacetic (TCA)-precipitable material in the presence of metabolic inhibitors is shown in Table 1.

TABLE 1
Effect of Inhibitors on Incorporation of $^{14}$C Labels

| Inhibitor | Conc., µg./ml. | Pretreatment of cultures in hours | Percent inhibition (average of 3 plates) |
|---|---|---|---|
| Cycloheximide | 100 | ½ | 82 |
| Do | 100 | 3½ | 92 |
| Actinomycin D | 20 | ½ | 48 |
| Do | 20 | 1½ | 70 |
| Do | 20 | 3½ | 91 |

Cycloheximide (10 µg./ml.) inhibits HEF protein synthesis quite effectively (80–90%), but actinomycin D (20 µg./ml.) acts rather slowly on HEF DNA dependent RNA synthesis.

The effects of cycloheximide (100 µg./ml.), and cycloheximide (100 µg./ml.) plus actinomycin D (20 µg./ml.) added at various times are shown in Tables 2 and 3.

TABLE 2
Effect of Metabolic Inhibition on $NDV_{uv}$ Stimulated Interferon

| Group | Cycloheximide, duration of exposure from hour 0 to hour— | Actinomycin D Time of addition (hours) | Actinomycin D Duration of exposure (hours) | Interferon yield (units) |
|---|---|---|---|---|
| I | None | None | None | 40 |
| II | 2 | None | None | 480 |
| III | 4 | None | None | 2,560 |
| IV | 4 | 0 | 1 | 160 |
| V | 4 | 1 | 1 | 160 |
| VI | 4 | 3 | 1 | 2,000 |
| VII | 5 | None | None | 1,284 |
| VIII | 5 | 3 | 1 | 2,560 |
| IX | 5 | 3 | 2 | 8,000 |
| X | 5 | 4 | 1 | 600 |

TABLE 3
Effect of Metabolic Inhibition Poly I: Poly C Stimulated Interferon

Effect of Metabolic Inhibitors on Poly I:Poly C Stimulated Interferon

| Group | Cycloheximide, exposure from hour 0 to hour— | Actinomycin D Time added (hours) | Actinomycin D Duration exposure (hour) | Interferon yield (units) |
|---|---|---|---|---|
| I | None | None | None | 32 |
| II | 2 | None | None | 192 |
| III | 3 | None | None | 300 |
| IV | 4 | 0 | 1 | <4 |
| V | 4 | 1 | 1 | <4 |
| VI | 4 | 2 | 1 | 600 |
| VII | 4 | 3 | 1 | 900 |

An interferon unit is defined as that amount of interferon contained in 0.1 ml. which will inhibit the cytopathic effects (CPE) by 50% on human fibroblast cultures 24–28 hours following challenge with 100 $TCID_{50}$ of Sindbis virus/6 mm. microwell culture. The kinetics of interferon production by HEF cells exposed to NDV for one hour are such that peak titer appears between 2–4 hours. The effect of cycloheximide (100 µg./ml.) on subsequent interferon production is shown in Table 2. Interferon production is measured 12 hours following removal of the metabolic inhibitor(s). Interferon yield is enhanced in all cases when compared to the "no treatment" group I. Maximal accentuation is observed with 4 hours exposure to cycloheximide. The effect of the addition of actinomycin D (20 µg./ml.) to cultures treated with cycloheximide is also shown in Table 2. Maximal enhancement is observed when actinomycin D is added at hour 3 and kept in the cultures for two hours in the presence of cycloheximide (group IX). One hour exposure to actinomycin D is not sufficient to abolish DNA dependent RNA synthesis in HEF cultures (Table 1) and is, therefore, less effective in accentuating interferon production (Table 2, groups VIII and X). It is believed that this type of accentuation is caused by inhibition of transcription of m-RNA for a protein which can terminate interferon synthesis.

The kinetics of interferon production by HEF cells exposed to poly I:poly C (100 µg./ml.) are such that peak titers appear at 3–5 hours. The effect of duration of exposure to cycloheximide on interferon production is shown in Table 3. Interferon production subsequent to exposure to cycloheximide increases with duration of exposure up to at least 3 hours (group III). Addition of actinomycin D (20 µg./ml.) at hour 2 or 3 accentuates interferon production. In the latter case (group VII) a 28-fold accentuation is observed.

The following description illustrates a specific application of the process of the invention in the production of interferon in human embryonic fibroblasts stimulated with poly I:poly C and Newcastle disease virus.

Human embryonic fibroblast cultures are prepared as described above, and exposed to NDV (0.2 ml.) or poly I:poly C (1 ml. containing 100 micrograms) in the presence of cycloheximide (100 micrograms/ml.). After one hour at 37° C. the inducers are removed and the cultures washed 3 times with 5 ml. HBSS. Fresh medium containing cycloheximide is added and incubation continued. Three hours after the addition of the inducers actinomycin D (20 m./ml.) is added. After 2 hours for NDV (1 hour for poly I:poly C) further incubation, the medium containing inhibitors is removed from the cultures which are then washed 3 times with 5 ml. of HBSS. The cultures are further incubated for 12 hours in fresh medium without inhibitors. Interferon production is now complete and the interferon may be harvested from the fluid portion of the cultures. The conditions described above are based on data in Tables 2 and 3.

Use of cycloheximide and actinomycin D in the procedures described above in the stimulation of interferon production in human leukocytes by Newcastle disease virus or parainfluenza 1 virus will result in high yields of interferon.

We claim:

1. A process for increasing the yield of human interferon obtained by stimulation of human fibroblast cells, comprising
   (a) exposing human fibroblast cells capable of producing interferon to an inducing-effective amount of an interferon inducer;
   (b) subsequent to or concomitant with the exposure to the interferon inducer, adding an amount of cycloheximide at a time prior to that when interferon production begins, said amount being sufficient to inhibit effectively protein synthesis;
   (c) when the maximum amount of interferon messenger RNA has been transcribed, adding actinomycin D in an amount sufficient to inhibit effectively synthesis of messenger RNA;
   (d) after the passage of time sufficient to inhibit the messenger RNA, removing the cycloheximide from the cells to permit protein synthesis and interferon production; and
   (e) incubating the cells to permit maximum interferon production.

2. A process according to claim 1 in which the inducer is a virus.

3. A process according to claim 1 in which the inducer is poly I:poly C.

4. A process according to claim 1 in which the concentration of cycloheximide is approximately 100 micrograms/ml.

5. A process according to claim 1 in which the concentration of actinomycin D is approximately 20 micrograms/ml.

6. A process according to claim 1 in which about 100 micrograms/ml. of cycloheximide are added to the cells with the inducer, about 20 micrograms/ml. of actinomycin D are added after about 3 to 4 hours, and the cycloheximide is removed from the cells after about 5 to 6 hours.

References Cited

Chemical Abstracts, vol. 73, entry 86140n, 1970, citing Armstrong, J. Gen. Physiol., 1970, 56(1) (pt. 2), 97S–98S.

De Clercq et al.: Arch. Intern. Med., vol. 126, p. 100, July 1970.

Dissertation Abstracts, vol. 30B, p. 311, 1969, citing Rossman, Some Factors Influencing Interferon Synthesis and Action in Relation to Animal Cells, New York Univ., 1968.

Vilcek et al.: Nature, 222, pp. 682 and 683, May 17, 1969.

RICHARD L. HUFF, Primary Examiner